Figure 1:
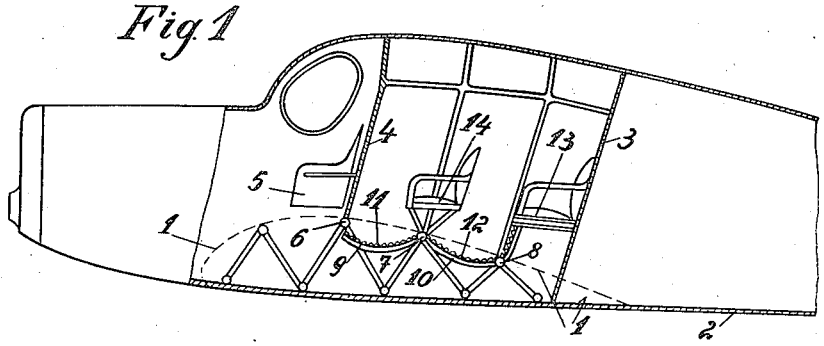

June 10, 1924.  1,496,887

H. JUNKERS

FLOORING FOR AERIAL VEHICLES

Filed Sept. 8, 1920

Inventor:
Hugo Junkers
by Attorney

Patented June 10, 1924.

1,496,887

UNITED STATES PATENT OFFICE.

HUGO JUNKERS, OF DESSAU, GERMANY.

FLOORING FOR AERIAL VEHICLES.

Application filed September 8, 1920. Serial No. 409,023.

*To all whom it may concern:*

Be it known that I, HUGO JUNKERS, a citizen of Germany, residing at Dessau, Germany, have invented certain new and useful Improvements in Flooring for Aerial Vehicles (for which I have filed an application in Germany, Nov. 17, 1919), of which the following is a specification.

My invention relates to aerial vehicles and more particularly to the configuration of the flooring of the spaces of aircraft adapted to be entered by the persons on board, the said flooring, in accordance with my said invention not constituting a level surface, but having a wavy form. By these means, regardless of the different inclines which the flying machine or the airship may assume, and such as will result in the course of the ascent or descent of the aircraft, or when it is resting on the earth, one portion of the floor section will always be located in a horizontal or approximately horizontal position, thereby always securing a reliable foothold for the inmates of the aircraft. Thus, for example, the upwardly disposed portions of the wavy floor sections constitute, on the aircraft assuming a sloping position, a series of steps not unlike those forming part of a stairway, which render it possible to walk along in the direction of the longitudinal axis of the aircraft without requiring any special provision of foot-boards. Moreover, the rising section of such an arched portion of the flooring which happens to lie in front of a seating accommodation will be found to constitute a convenient foot rest for the person occupying said seat. Lastly, owing to the good supporting capacity proper to the sagging arched portions, the flooring may be made specially light in weight.

The said sagging portions may be either simply fixed intermediate the transverse trusses of the hull or else between the beams of the supporting plane adjoining immediately beneath.

In the drawings affixed to this specification and forming part thereof different modifications of a flooring embodying my invention are illustrated by way of example.

In the drawings—

Figure 2:
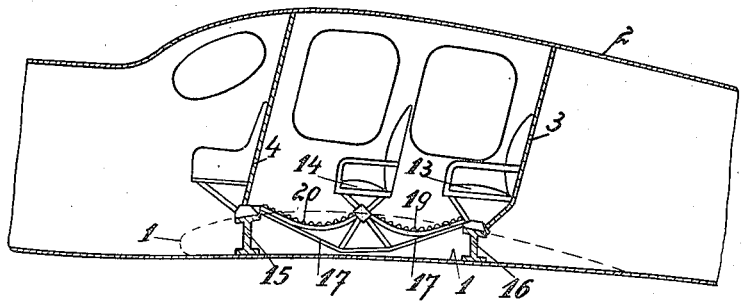
Figure 3:
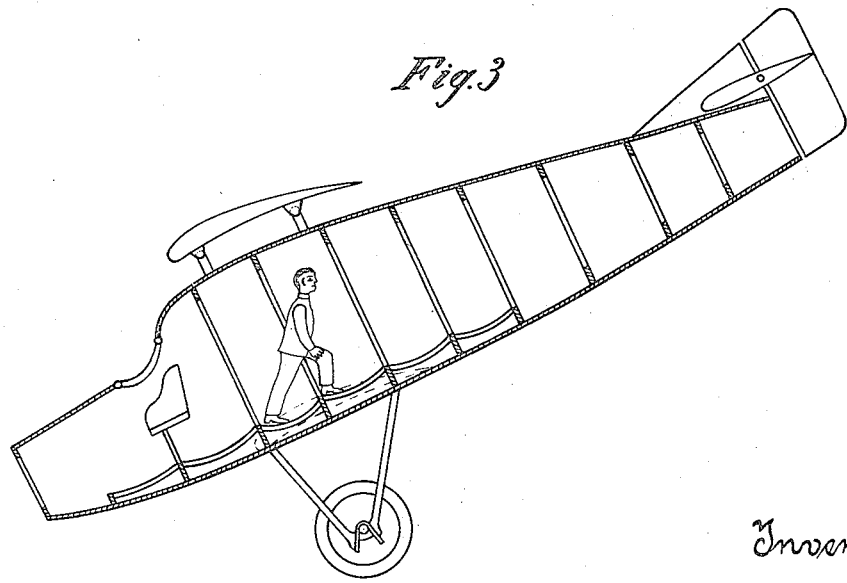

Fig. 1 is a longitudinal section of a modification in which a wavy intermediate floorication is provided for always one row of seats, Fig. 2 is a like view of a modified form in which on a frame, forming the joint support for two rows of seats, there are arranged special arched sections, one for each row, Fig. 3 is a similar view illustrating the peculiar construction of the flooring of an extended passage formed assembling and joining a series of wavy elements.

Referring to Fig. 1 of the drawings, the hull 2 of the air craft is directly lodged on the supporting plane 1 which for its part constitutes a comparatively stout, self-supporting surface. Within the hull there is arranged the passengers' compartment proper, formed by means of two partition walls 3, 4. In front of the said compartment there are arranged one beside the other the seats 5 for the two pilots.

The floor of the compartment consists of two coved or arched sheet metal elements 11, 12, reinforced by longitudinal members 9, 10 and suspended to the girders 6, 7, 8 of the supporting planes in such a manner that the passengers' seats will be located above the highest point of said arched portions.

The front end of each of these coved or arched elements 11, 12 offers at the incline at which it is disposed, a convenient foot-rest for the person seated within the compartment, while the rear end of said coved element will, when the aircraft is standing still and its tail end is consequently at a steep incline, be disposed almost horizontally and will thus constitute a good foothold when entering the compartment or when walking to the front seats.

The reliability of the foothold may be still further enhanced by covering the floor with a carpet which will not only adapt itself closely to the shape of the unbroken arch or cove, but will moreover fit itself snugly on the undulated sections of the corrugated or fluted sheet metal, so that the possibility of the foot slipping is prevented to the utmost extent possible. Besides, these transversely disposed corrugations give to the floor such a degree of bending strength that the arrangement of special cross members is not required.

In the modification disclosed in Fig. 2 the arrangement of the hull 1 as also of the supporting plane 2 and of the partition walls 4, 3 is similar to that shown in Fig. 1. In this modification there is, however, this difference that the supporting plane 2 is only provided with two beams 15, 16, disposed at a fairly large distance the one from the other, intermediate which there is suspended a frame consisting of longitudinal members 17. By means of the parts 19, 20 inserted between the seats 13, 14, there is again secured a cove-shaped bulging in of the floor surface, by means of which the horizontal sections required as a foothold in the course of the different inclines assumed by the aircraft are produced in the same manner as in the first case.

Fig. 3 illustrates an aircraft provided with an extended passage composed of a plurality of arched elements suitably jointed and assembled, which will allow of a convenient walking even when the aircraft assumes an extremely sloping position.

The bulged sections of the flooring may, if preferred, be composed of a plurality of level parts, which in cross section embody either an approximately flat triangle, trapezium or square, open on top.

I claim:

1. Aircraft hull comprising an intermediate flooring subdivided into segments having the form of transversely extending shallow channels.

2. An aircraft hull comprising in combination, two seats, one behind the other and an intermediate flooring, extending between said seats and sloping downwards from each seat.

3. An aircraft hull comprising in combination, a wavy intermediate flooring and seats arranged on the wave crests.

4. Aircraft hull comprising an intermediate flooring subdivided into segments having the form of transversely extending shallow channels of corrugated sheet metal, the corrugations extending in parallel to the edges of the channels.

5. An aircraft hull comprising in combination, two seats, one behind the other and an intermediate flooring of transversely corrugated sheet metal, extending between said seats and sloping downwards from each seat.

6. An aircraft hull comprising in combination, transversely extending structural members and a wavy intermediate flooring attached to and suspended between such members.

In testimony whereof I affix my signature.

HUGO JUNKERS.